United States Patent
Cunningham

(12)
(10) Patent No.: US 6,810,784 B1
(45) Date of Patent: Nov. 2, 2004

(54) GLASS WORKPIECE TRANSPORTING AND LOCATING SYSTEM

(75) Inventor: Dennis J. Cunningham, Zelienople, PA (US)

(73) Assignee: Billco Manufacturing, Inc, Zelienople, PA (US)

( * ) Notice: Subject to any disclaimer, the term of this patent is extended or adjusted under 35 U.S.C. 154(b) by 393 days.

(21) Appl. No.: 09/277,534

(22) Filed: Mar. 26, 1999

(51) Int. Cl.[7] .............................. B26D 3/00; C03B 33/03
(52) U.S. Cl. ............................ 83/879; 83/99; 83/100; 83/266; 83/268; 83/277; 65/174; 414/20
(58) Field of Search .......................... 83/24, 99, 402, 83/451, 879, 880, 100, 152, 255, 257, 266, 268, 277; 65/56, 97, 105, 112, 174, 175, 176, 177; 414/14, 15, 16, 17, 18, 19, 20

(56) References Cited

U.S. PATENT DOCUMENTS

| | | | |
|---|---|---|---|
| 3,253,755 A | 5/1966 | Haley et al. .................... 225/2 |
| 3,374,078 A | 3/1968 | Wright ....................... 65/182.2 |
| 3,424,357 A | 1/1969 | Curtze et al. .................. 225/2 |
| 3,613,974 A | * 10/1971 | Chatelain et al. ......... 225/96 X |
| 3,740,524 A | 6/1973 | Dahlberg et al. ...... 219/121.69 |
| 4,354,796 A | 10/1982 | Bergman .................... 414/676 |
| 4,544,824 A | 10/1985 | Knutsson ............... 219/121.67 |
| 4,587,873 A | 5/1986 | Gerber ......................... 83/100 |
| 4,667,555 A | * 5/1987 | Lisec .......................... 83/879 |
| 4,747,329 A | 5/1988 | Lukens, Jr. .................... 83/29 |
| 5,054,355 A | * 10/1991 | Tisse et al. .................... 83/879 |
| 5,205,705 A | 4/1993 | Jenkner .................... 414/796.8 |
| 5,246,331 A | 9/1993 | Hallahan et al. ............ 414/676 |
| 5,398,579 A | * 3/1995 | Bando ......................... 83/879 |
| 5,507,212 A | * 4/1996 | Morrison ..................... 83/879 |
| 5,507,616 A | * 4/1996 | Perobelli et al. ......... 414/789.5 |
| 5,759,222 A | * 6/1998 | Bando ...................... 83/879 X |
| 5,857,398 A | * 1/1999 | Bando ......................... 83/879 |
| 5,873,922 A | * 2/1999 | Lisec ...................... 83/879 X |
| 5,944,244 A | * 8/1999 | Lisec ........................ 225/96.5 |

* cited by examiner

Primary Examiner—Clark F. Dexter
(74) Attorney, Agent, or Firm—Blynn L. Shideler; Krisanne Shideler; BLK Law Group

(57) ABSTRACT

A glass transporting and locating system for a glass cutting table with a bridge extending across the glass cutting table which is movable along the length of the glass cutting table. A glass workpiece feeding table is positioned adjacent the glass cutting table and adapted to support a glass workpiece to be fed to the glass cutting table. At least one vacuum chuck is carried by the bridge at a position which can overlap a glass workpiece supported on the glass workpiece feeding table when the bridge is at one end of the glass cutting table. The system includes a device for aligning the glass workpiece which is supported on the glass workpiece feeding table. The alignment device may include a retractable stop on the bridge or on the glass workpiece feeding table. The retractable stop on the bridge may also be used for advancing finished workpieces off of the glass cutting table. The glass workpiece transporting and locating system is adapted to be easily retrofitted to existing glass cutting tables.

13 Claims, 2 Drawing Sheets

GLASS WORKPIECE TRANSPORTING AND LOCATING SYSTEM

BACKGROUND OF THE INVENTION

1. Field of the Invention

The present invention relates to a glass workpiece transporting and locating system for a glass processing machine, more specifically, the present invention relates to a glass transporting and locating system for a glass cutting table which can be easily retrofitted to existing glass cutting tables.

2. Prior Art

In the glass processing industry, a conventional glass cutting table comprises an air float table for transporting the glass workpiece to be cut and a bridge extending across the air float table. A vacuum or vent in the air float table will hold the workpiece for scoring. The bridge is movable along the air float table. The bridge typically includes a glass cutting head, also called a glass scoring head, for processing or cutting the glass workpiece according to a predetermined pattern. The glass workpieces must be fed onto and off of the glass cutting table. Additionally, the glass workpieces must be aligned on the glass cutting table. The alignment process typically utilizes two sets of perpendicular stops on the glass cutting table or a plurality of workpiece sensors on the bridge or the like for determining the exact orientation of the glass workpiece prior to cutting. The feeding and discharge of glass workpieces to and off of the glass cutting table is inefficient and often labor intensive.

The glass machining industry utilizes a wide variety of glass workpiece conveying and locating devices. For example, U.S. Pat. Nos. 4,354,796 and 4,444,541 to Bergman both disclose an air float table next to a conveyor which utilizes mechanical engagement between a pin and a workpiece carrying pallet for moving the pallet and clamped workpiece onto the desired location onto the air table for appropriate machining and the like. U.S. Pat. No. 5,246,331 to Hallahan et al. is directed toward an air float assembly table utilizing a vacuum cup assembly mounted on a carriage for engaging and linearly positioning the glass workpiece. Other glass transporting and processing systems are shown in U.S. Pat. No. 4,747,329 to Lukens, Jr. and U.S. Pat. No. 3,740,524 to Dahlberg et al. The difficulties with these prior art systems is that they are not easily adapted for use with existing glass cutting tables, such as shown in U.S. Pat. No. 3,424,357 to Curtze et al. or U.S. Pat. No. 3,253,756 to Haley et al.

The object of the present invention is to overcome the aforementioned difficulties with the prior art. A further object of the present invention is to provide a glass transporting and locating system for a glass cutting table which can be easily retrofitted to existing glass cutting tables. A further object of the present invention is to provide a glass workpiece transporting and locating system for a glass cutting table which simultaneously feeds glass workpieces to the glass cutting table and ejects finished workpieces therefrom.

SUMMARY OF THE INVENTION

The above objects are achieved with a glass workpiece transporting and locating system according to the present invention. The glass workpiece transporting and locating system includes a bridge extending across the glass cutting table and movable along the length of the glass cutting table. A glass workpiece feeding table, such as an air float table, is positioned adjacent the glass cutting table and adapted to support a glass workpiece to be fed to the glass cutting table. At least one vacuum chuck is carried by the bridge at a position adapted to overlap a glass workpiece supported on the glass feeding table when the bridge is at one end of the glass cutting table. The glass workpiece transporting and locating system includes a mechanism for aligning the glass workpiece on the glass workpiece feeding table.

The mechanism for aligning glass workpieces on the glass workpiece feeding table may be formed of a retractable stop on the bridge with the retractable stop engagable with an edge of the glass workpiece supported on the glass workpiece feeding table for aligning the glass workpiece. Additionally, the retractable stop on the bridge may also engage with an edge of a finished glass workpiece on the glass cutting table for ejecting the glass workpiece off of the glass cutting table. A pair of retractable stops may also be positioned on the glass workpiece feeding table. Additionally, in one embodiment of the present invention, a plurality of spaced vacuum chucks are provided on the bridge.

The glass workpiece transporting and locating system of the present invention is easily retrofitted onto existing glass cutting tables by providing a glass workpiece feeding table adjacent the glass cutting table and providing at least one vacuum chuck carried on the bridge at a position such that the vacuum chuck can overlap a glass workpiece supported on the glass workpiece feeding table when the bridge is at one end of the glass cutting table. The mechanism for aligning the glass workpiece on the glass workpiece feeding table can be installed as either retractable stops in the glass workpiece feeding table or retractable stops in the bridge, or both.

The present invention provides a method for feeding glass workpieces to a glass cutting table which begins with the moving of the glass workpiece onto the glass workpiece feeding table positioned adjacent the glass cutting table. The bridge of the glass cutting table is moved to one end of the glass cutting table such that at least one vacuum chuck carried thereon is overlapping the glass workpiece supported on the glass workpiece feeding table. The vacuum chuck is engaged with the glass workpiece on the glass workpiece feeding table and the bridge is advanced to move the glass workpiece onto the glass cutting table. Retractable stops on the bridge may be used for aligning the glass workpiece on the glass workpiece feeding table and/or ejecting a finished glass workpiece off of the glass cutting table.

The vacuum chucks carried on the bridge may not overlap the glass workpiece feeding table itself, but only overlap the glass workpiece supported thereon. For example, in a manual operation, the operator may advance the glass workpiece along the glass workpiece feeding table until a leading edge of the glass workpiece abuts a stop carried by the bridge. In this position, the leading edge of the glass workpiece may extend beyond the feeding table with the vacuum chucks overlapping the glass workpiece but not the feeding table.

These and other advantages of the present invention will be clarified in the detailed description of the preferred embodiments wherein like reference numerals represent like elements throughout.

BRIEF DESCRIPTION OF THE PREFERRED EMBODIMENTS

Figure 1:
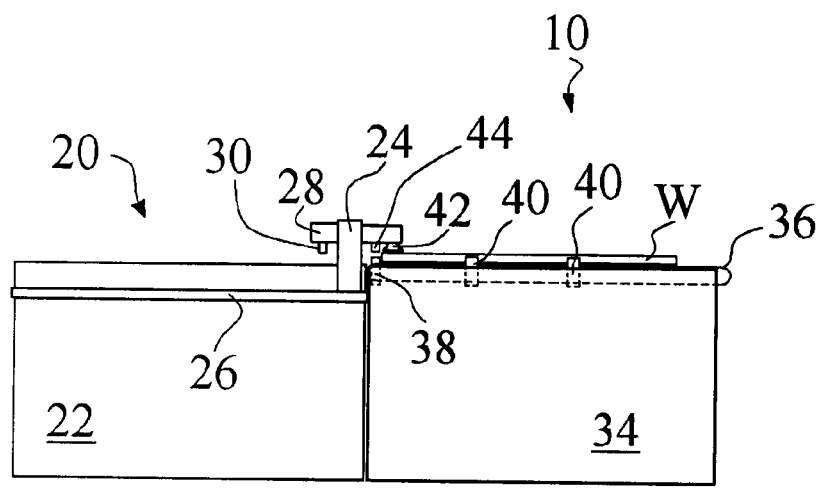
FIG. 1 is a schematic side view of the glass workpiece transporting and locating system according to the present invention.
Figure 2:
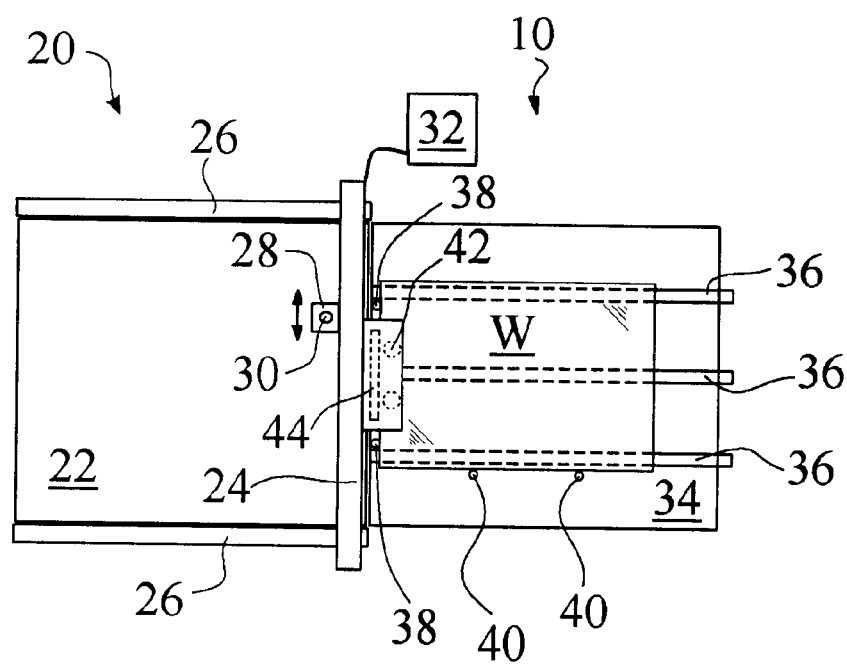
FIG. 2 is a schematic plan view of the glass workpiece transporting and locating system illustrated in FIG. 1.

FIGS. 1 and 2 schematically illustrate a glass transporting and locating system 10 according to the present invention. The system 10 is specifically for use with a conventional glass cutting table 20, however, the system 10 can be utilized with any glass processing machine, such as an edge grinder or the like. The glass cutting table 20 includes a conventional air float table 22 for transporting a glass workpiece W thereon. A movable bridge 24 extends across the air float table 22 and is movable along the air float table 22 along tracks 26. A carriage 28 is supported along the bridge 24 for movement along the bridge 24. The carriage 28 includes a glass cutting head 30 for scoring or cutting a glass workpiece supported on the glass cutting table 20. The glass cutting head 30, carriage 28 and bridge 24 are controlled in a conventional fashion by a programmable controller 32. The controller 32, glass cutting head 30, carriage 28, tracks 26, bridge 24 and air float table 22 of the glass cutting table 20 represent a conventional glass cutting table 20.

The system 10 additionally includes a glass workpiece feeding table 34 positioned immediately adjacent the air float table 22. The feeding table 34 may be an air float table or may include a mechanical glass workpiece conveying system such as belts 36, or may include both. The feeding table 34 may include a pair of retractable stops 38 adjacent the forward edge of the feeding table 34 with the retractable stops 38 adapted to engage a leading edge of the rectangular glass workpiece W for aligning the glass workpiece W at the end of the feeding table 34. The feeding table 34 may also include side guides 40 for aligning an edge of the glass workpiece W which is perpendicular to the edge aligned by the retractable stops 38. The use of both retractable stops 38 and side guides 40 will assure that the glass workpiece W is precisely positioned during loading of the glass workpiece W onto the glass cutting table 20. Other methods of positioning the glass workpiece W may be used.

Figure 3:
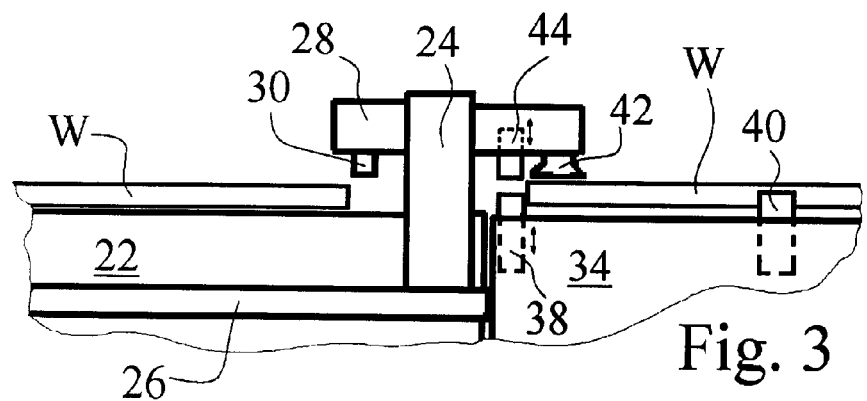
FIGS. 3–6 schematically illustrate the glass workpiece handling sequence for the glass transporting and locating system illustrated in FIGS. 1 and 2.

The system 10 of the present invention additionally includes a plurality of spaced vacuum chucks 42 attached to the bridge 24 at a position such that when the bridge 24 is moved to the end of the tracks 26 adjacent the feeding table 34, the vacuum chucks 42 will overlap the end of the feeding table 34 and overlap the glass workpiece W positioned adjacent the retractable stops 38, as shown in FIGS. 1–3. The vacuum chucks 42 do not need to overlap the feeding table 34, only the glass workpiece W supported thereon. The vacuum chucks 42 are vertically movable in a conventional fashion for engagement with the glass workpiece W for securing the vacuum chucks 42 to the glass workpiece W.

Figure 5:
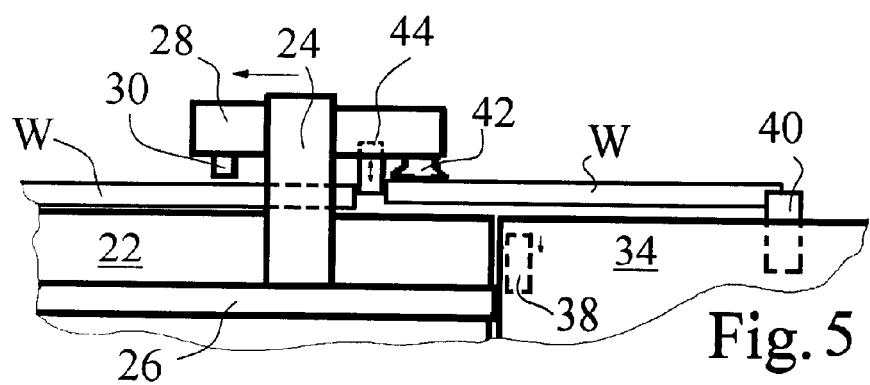

The system 10 of the present invention additionally includes a retractable stop carried by the bridge 24 in the form of retractable fence 44. The fence 44 is adapted to engage with a side edge of the glass workpiece W supported on the feeding table 34 for aligning the glass workpiece W prior to engagement of the vacuum chucks 42, as shown in FIG. 3. In this manner, the fence 44 operates the same as retractable stops 38. Additionally, the fence 44 is adapted to engage a trailing edge of a glass workpiece W which has been processed on the glass cutting table 20 for ejecting the finished glass workpiece 20 off of the air float table 22 as illustrated in FIG. 5. The fence 44 can also be used in place of the retractable stops 38.

Figure 4:
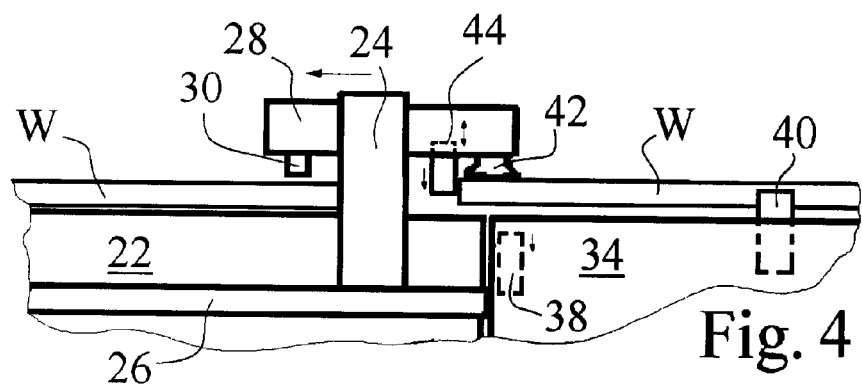
Figure 6:
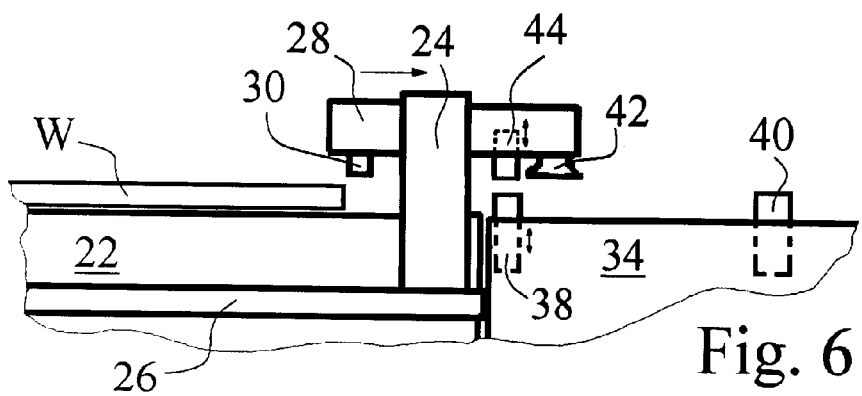

The details of system 10 will be clarified by review of the operation thereof for loading a glass workpiece W onto the glass cutting table 20. The glass workpiece W is first transported onto the feeding table 34 in a conventional fashion, such as by conveyor belts 36 or the like, until the glass workpiece W abuts against retractable stops 38. The glass workpiece W may be biased against side guides 40, such as by gravity feed or the like, such that the side guides 40 and retractable stops 38 combine to precisely position the rectangular glass workpiece W on the feeding table 34. The bridge 24 is moved on tracks 26 to the end of the tracks 26 adjacent the feeding table 34 to a position where the vacuum chucks 42 overlap the feeding table 34 and the glass workpiece W and where the fence 44 engages the leading edge of the glass workpiece W. This position is illustrated in FIG. 3. Following the position illustrated in FIG. 3, the vacuum chucks 42 will be activated in a conventional fashion to attach the vacuum chucks 42 to the glass workpiece W. The retractable stops 38 are then retracted and the bridge 24 moved along tracks 26 to transport the glass workpiece W attached to the vacuum chucks 42 onto the glass cutting table 20, as shown in FIGS. 4 and 5. As shown in FIG. 5, the fence 44 will contact a trailing edge of the glass workpiece W which has been processed on the glass cutting table 20 and will serve to eject the processed glass workpiece W from the glass cutting table 20 as the new glass workpiece W is simultaneously fed onto the glass cutting table 20. After positioning of the glass workpiece W onto the glass cutting table 20, the vacuum chucks 42 can be released, the fence 44 retracted and the bridge 24 moved to a starting position for processing the glass workpiece W. This movement is shown schematically in FIG. 6.

The system 10 is not limited to the embodiment illustrated in the figures which is merely representative of the present invention. For example, the vacuum chucks 42 may not overlap the feeding table 34 and the retractable stops 38 may be eliminated. With these modifications, the glass workpiece W will be advanced on the feeding table 34 until a leading edge engages the fence 44 which may be at a position extending beyond the feeding table 34. This initial glass workpiece engaging position would be similar to the position shown in FIG. 5. The vacuum chucks 42 can then engage the glass workpiece W to complete the transfer of the glass workpiece W onto the glass cutting table 20. The system 10 may also eliminate the side guides 40 and rely on another system, such as edge detecting sensors, to precisely locate the glass workpiece W.

It will be evident that the system 10 of the present invention is easily retrofitted to existing glass cutting tables 20. In retrofitting an existing glass cutting table 20, a feeding table 34, with or without retractable stops 38 and side guides 40, is provided. The bridge 24 is modified to include the vacuum chucks 42 and fence 44. The vacuum chucks 42 and fence 44 may be on the opposite side of the bridge 24 from that schematically shown in the figures depending on the position of the cutting head 30. This relative positioning would not effect the operation or design of the system. The controller 32 which controls the movement of the bridge 24, carriage 28 and cutting head 30 can also be used for controlling the vacuum chucks 42, the retractable fence 44 and the retractable stops 38. The present invention is disclosed as being used with glass workpieces W, however, it can be used with any frangible workpieces, such as silicon wafers, tile products or the like. The term glass workpieces is intended to cover these frangible workpieces as well.

It will be evident that various modifications may be made to the present invention without departing from the spirit and scope thereof. For example, the system 10 shows the vacuum chucks 42 adapted to overlap the feeding table 34. The present invention can be used where the vacuum chucks 42 only overlap the glass workpiece W carried by the feeding table 34 and not the feeding table 34 itself. Additionally, the retractable stops can be eliminated and only the fence 44 utilized for aligning the leading edge of the glass workpiece W; side guides 40 may be eliminated if another mechanism is utilized for determining the side-to-side location of the glass workpiece W. Further, instead of utilizing the conventional bridge 24 for the glass cutting table 20, a secondary bridge can be provided such that the cutting head 30 can operate independently of the loading mechanism. The above examples are intended to be merely illustrative of the present invention and not restrictive thereof. The scope of the present invention is intended to be defined by the appended claims and equivalents thereto.

What is claimed is:

1. A glass workpiece transporting and locating system for a glass cutting table comprising:
   a bridge extending across the glass cutting table and movable along the length of the glass cutting table;
   a glass workpiece feeding table adjacent the glass cutting table and supporting a glass workpiece to be fed to the glass cutting table;
   at least one vacuum chuck carried by said bridge at a position overlapping the glass workpiece supported on said glass workpiece feeding table when said bridge is at one end of the glass cutting table; and
   a means for aligning the glass workpiece which is supported on said glass workpiece feeding table.

2. The glass workpiece transporting and locating system of claim 1 wherein said means for aligning said glass workpiece includes a retractable stop positioned on said bridge.

3. The glass workpiece transporting and locating system of claim 2 wherein said retractable stop is engagable with an edge of a finished workpiece on the glass cutting table for advancing the finished workpiece on the glass cutting table.

4. The glass workpiece transporting and locating system of claim 1 wherein said means for aligning the glass workpiece includes a retractable stop in said glass workpiece feeding table.

5. The glass workpiece transporting and locating system of claim 1 wherein said at least one vacuum chuck comprises a plurality of spaced vacuum chucks on said bridge.

6. The glass workpiece transporting and locating system of claim 1 wherein said glass workpiece feeding table is an air float table.

7. A glass processing machine comprising:
   an air float table for supporting a glass workpiece thereon;
   a glass workpiece processing tool engagable with the glass workpiece supported on said air float table;
   a workpiece feeding table adjacent said air float table supporting glass workpieces to be fed to said air float table; and
   at least one vacuum chuck movable along at least a portion of said air float table, said at least one vacuum chuck engagable with glass workpieces on said workpiece feeding table for feeding the glass workpieces to said air float table.

8. The glass processing machine of claim 7 further including a bridge across said air float table wherein said at least one vacuum chuck is supported on said bridge.

9. The glass processing machine of claim 8 wherein said glass workpiece processing tool is a glass cutting head supported on said bridge.

10. The glass processing machine of claim 8 further including a workpiece engaging stop extending from said bridge, said stop engaging a glass workpiece supported on said air float table for transporting the glass workpieces off of said air float table.

11. The glass processing machine of claim 10 wherein said workpiece engaging stop is engagable with a glass workpiece supported on said glass workpiece feeding table for aligning the glass workpiece to be fed to said air float table.

12. The glass processing machine of claim 10 wherein said workpiece engaging stop is a retractable stop on said bridge.

13. A workpiece feeding device for a glass cutting table, the cutting table having an air float table supporting glass workpieces, a bridge extending across said air float table movable along the length of the air float table and supporting a glass cutting head for scoring a glass workpiece supported thereon, said workpiece feeding device including:
   a workpiece feeding table adjacent the air float table of the glass cutting table and supporting glass workpieces to be fed to the air float table; and
   at least one vacuum chuck attached to the bridge of the glass cutting table, said at least one vacuum chuck positioned to overlap glass workpieces supported on said glass workpiece feeding table when the bridge is at one end of the glass cutting table whereby said at least one vacuum chuck is engagable with the glass workpiece which is supported on said workpiece feeding table for feeding the glass workpiece to the air float table, and further including a retractable stop on said bridge engaging an edge of the glass workpieces on said workpiece feeding table for aligning the glass workpieces and further engaging an edge of the glass workpieces on the air float table for advancing the glass workpieces off of the air float table.

* * * * *